United States Patent
Chaudhary et al.

(10) Patent No.: US 11,797,361 B2
(45) Date of Patent: Oct. 24, 2023

(54) SYSTEM AND METHOD FOR ROUTING REQUESTS FOR EVENTS

(71) Applicant: Charles Schwab & Co., Inc, San Francisco, CA (US)

(72) Inventors: Shahbaz Chaudhary, Chicago, IL (US); Justin Robischon, Parker, CO (US); Jodi Blomberg, Denver, CO (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 18/173,944

(22) Filed: Feb. 24, 2023

(65) Prior Publication Data
US 2023/0205612 A1  Jun. 29, 2023

Related U.S. Application Data

(63) Continuation of application No. 17/348,761, filed on Jun. 15, 2021, now Pat. No. 11,609,805.

(60) Provisional application No. 63/039,027, filed on Jun. 15, 2020.

(51) Int. Cl.
G06F 9/54 (2006.01)
G06N 7/01 (2023.01)

(52) U.S. Cl.
CPC ............... *G06F 9/542* (2013.01); *G06N 7/01* (2023.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | |
|---|---|---|---|
| 10,776,243 B1 | 9/2020 | Kochar | |
| 10,798,030 B1* | 10/2020 | Igure | G06F 40/56 |
| 10,977,563 B2* | 4/2021 | Ajmera | G06Q 30/0202 |
| 11,188,846 B1 | 11/2021 | He et al. | |
| 11,271,877 B2 | 3/2022 | Goyal et al. | |
| 2022/0019935 A1 | 1/2022 | Ghatage et al. | |

* cited by examiner

*Primary Examiner* — Andy Ho
(74) *Attorney, Agent, or Firm* — Harness, Dickey & Pierce, P.L.C.

(57) ABSTRACT

A system and method receives a request for an event that is not fully specified, and predicts sufficient details of the event to instruct a hardware distributor to route the 5 request to an agent that can handle the predicted request.

20 Claims, 4 Drawing Sheets

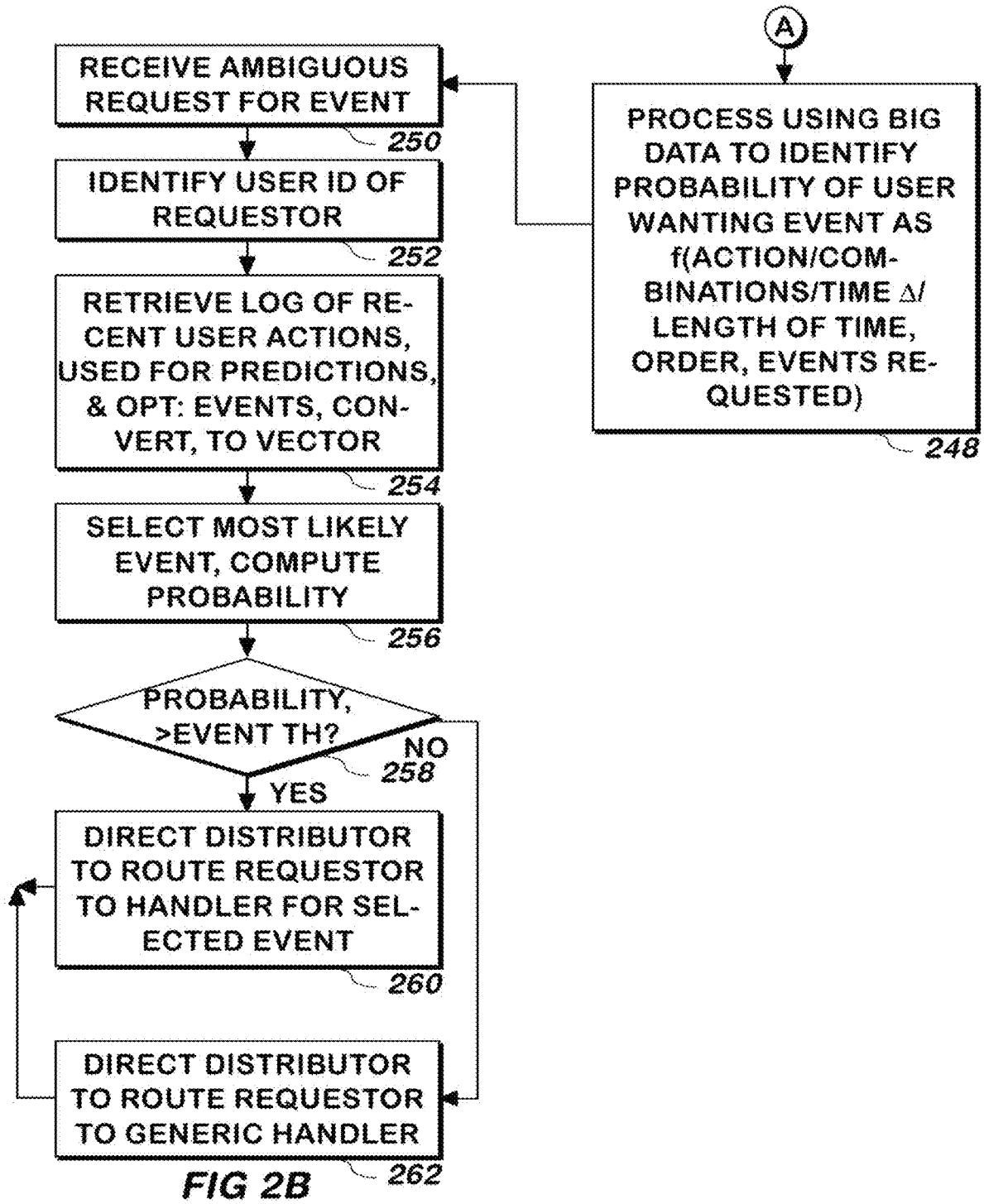

SYSTEM AND METHOD FOR ROUTING REQUESTS FOR EVENTS

CROSS-REFERENCE TO RELATED APPLICATIONS

This application is a continuation of U.S. application Ser. No. 17/348,761, filed Jun. 15, 2021, U.S. Provisional Patent Application Ser. No. 63/039,027 entitled, "Method and Apparatus for Routing Requests for Events" filed on Jun. 15, 2020, the entire disclosures of which are incorporated by reference.

FIELD OF THE INVENTION

The present invention is related to computer software and hardware and more specifically to computer software and hardware for routing requests.

BACKGROUND OF THE INVENTION

Users may interact with a company via different activities. Two types of such activities are actions and events. For example, a user may perform actions on the company's web site by requesting web pages, which are provided to the user automatically, without the intervention of another party.

The user may also request events. An event is an activity that the user can not receive the information desired without additional interaction from another party, such as an agent for the operator of the web site. For example, an action may be a phone call by the user to the company phone number, or a chat session or an email request.

When the user performs an action, the user can frequently indicate the precise information requested. When the user requests an event, the event is typically requested as an ambiguous event, in which the precise information requested will be interpreted by a human. The human agent can sometimes respond to the request or other times, route the requestor to another human agent with specialized knowledge that may be required to provide the information the requestor seeks. Even if the other party responding to the event request is a computer system, such as a chat bot, it may be necessary to first identify the general nature of the request to route the requestor to the chat bot that can properly interpret the request. This approach is suboptimal. What is needed is a system and method that can automatically route a requestor of an event to the proper party that can respond to the type of event the requestor wishes to request.

SUMMARY OF INVENTION

A system and method logs actions of a user. An action of a user may include a request for information that the user can perform autonomously, without assistance, such as a request for a web page made by the user. The system and method also logs events, which may include requests for information that the user cannot perform autonomously, such as a request via a chat session. The system and method logs the events and actions with the date and time they were performed or requested, and the identifier of the user who performed or requested them. The actions and events in the log are specified using an identifier of the action, such as a web URL that was requested by the user, or an identifier of the event, such as the type of information the user requested.

The system and method then uses the log containing information of multiple users to calculate certain probabilities that an action of the user will be followed by a request for a specific event by that user. Those actions that fall below a threshold probability of predicting any event are removed from consideration for the purpose of predicting the event, and may optionally no longer be logged.

Conventional big data techniques are used to identify probabilities of each one or more events occurring by a user following actions of the user as a function of any or all of the action, a combination of actions, either specified or any from the same type, the order of actions and other actions, the time between the action or combination and event, and the duration of the action.

At any time, a user may request an ambiguous event. An ambiguous event is an event that is requested without a specific type. For example, the user may start a chat session, send an email message, or place a phone call without specifying for what subject the chat session, email, or phone call is requested. Different types of events may require specialized knowledge for which the entity, such as a person, who will handle the event, will require to handle the event.

To avoid the cost to the vendor providing such knowledge, and inconvenience to the user, avoiding the two step process of sending the user to a general event handler who does not possess the specialized knowledge the user needs, and then transferring the user to a specialized event handler who does have that specialized knowledge, a prediction is made as to the specific event the user is requesting via the ambiguous request they have made. To make this prediction, the user is identified and the most recent actions and events of the user are retrieved from the log, and used along with the dates and times and durations of the actions and the probabilities obtained from the actions of the many users as described above and herein to identify the event with the highest probability of being requested by that user based on that user's actions. If the probability exceeds a global threshold for all events or a threshold for the identified event, the caller is automatically routed to an agent with specialized knowledge of that specific event merely by making the request for the ambiguous event, without providing any additional information about the specific event desired following that request, and otherwise may be routed to an agent with general knowledge of events, by a specialized routing device that routes such requests.

In one embodiment, if the threshold for the event is not met, an event with a lower probability of being the event the user wants is used to route the caller to an agent who has the specialized knowledge of that lower probability event, as long as it is above the threshold for that event. The event with the highest such probability exceeding its threshold may be used to route the caller.

DETAILED DESCRIPTION OF A PREFERRED EMBODIMENT

Figure 1:
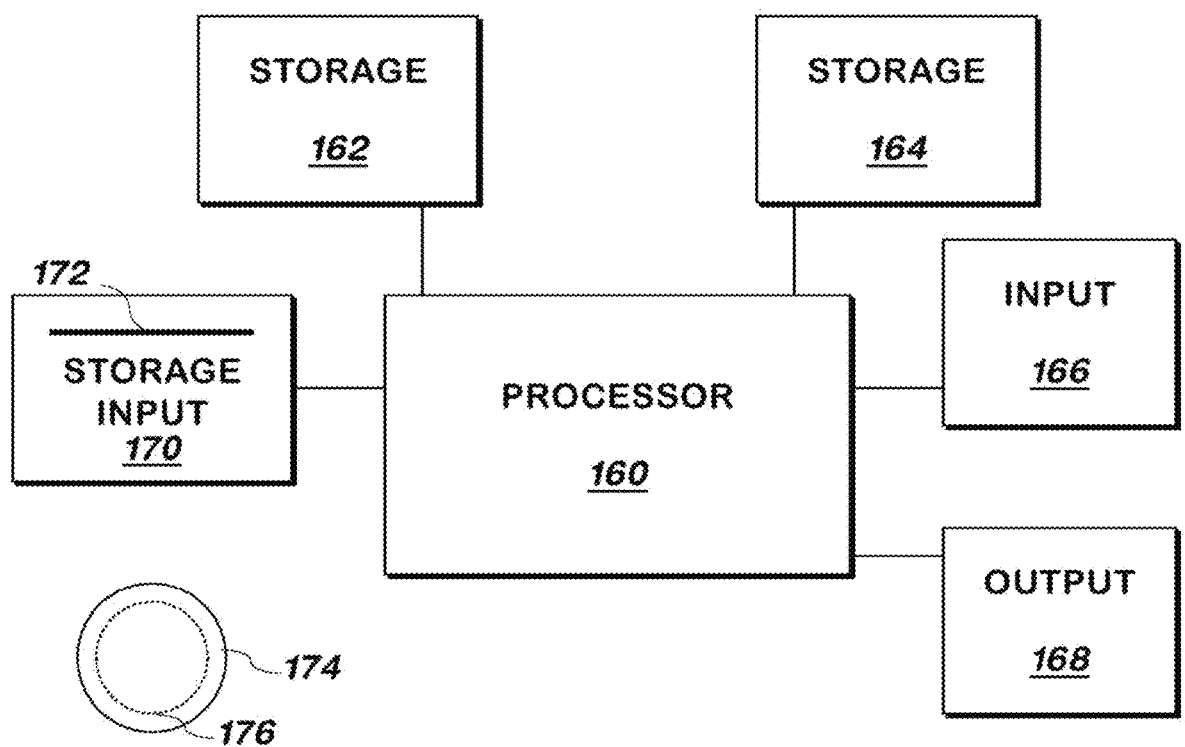
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, Calif., a PENTIUMcompatible personal computer system such as are available from DELL COMPUTER CORPORATION of Round Rock, Tex. running a version of the WINDOWS operating system (such as WINDOWS 10) commercially available from MICROSOFT Corporation of Redmond Wash. or a Macintosh computer system running the MACOS (such as Mojave) or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
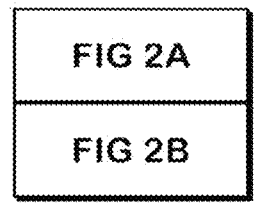
FIG. 2 consisting of FIG. 2A and FIG. 2B, is a flowchart illustrating a method of routing event requests according to one embodiment of the present invention.
Figure 2A:
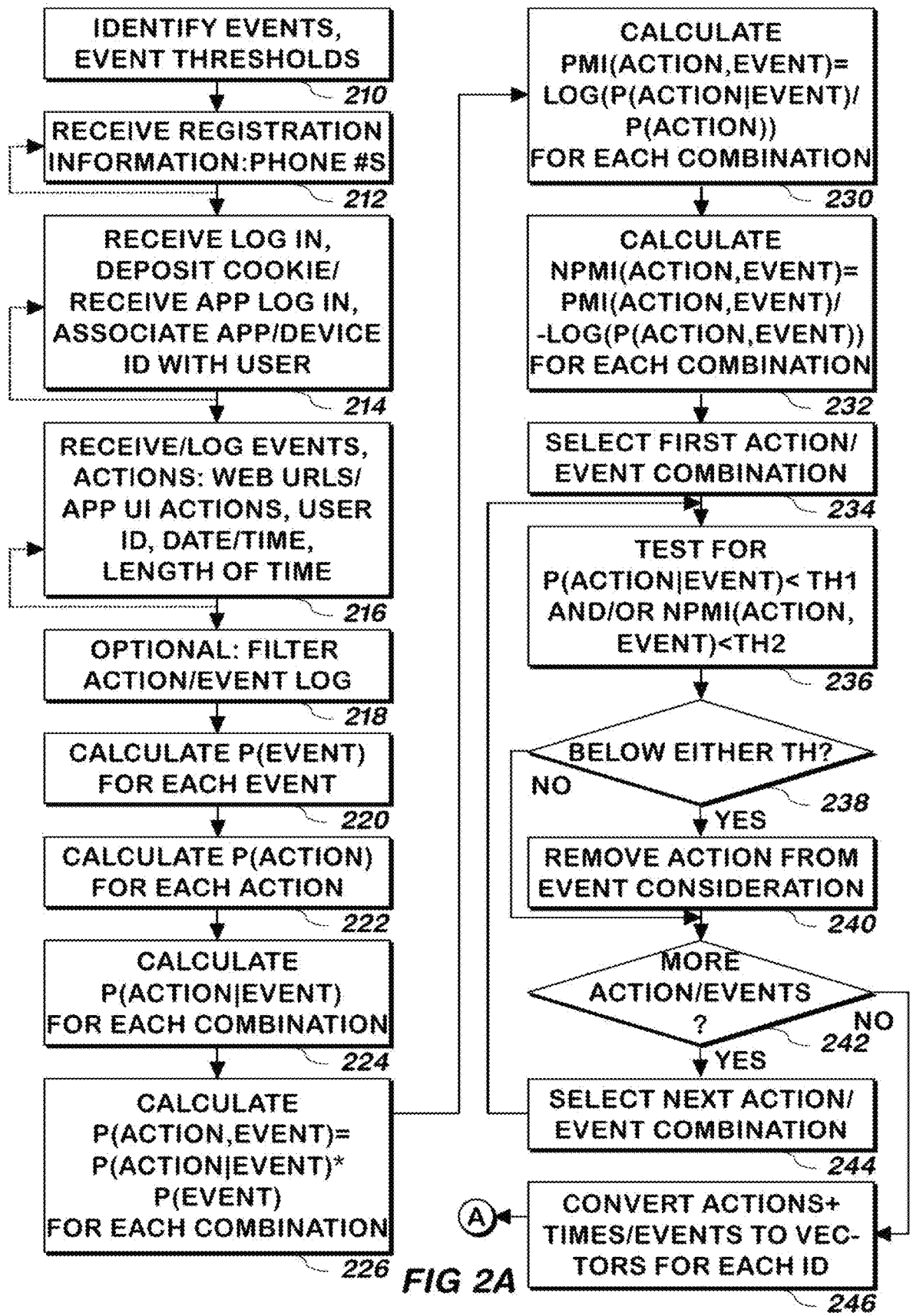

Referring now to FIG. 2, consisting of FIG. 2A and FIG. 2B, a method of routing communications is shown according to one embodiment of the present invention. Events are identified 210. In one embodiment, an event includes a request for a specific type of information that the user cannot or does not specify when making the request, but may be required or helpful to fulfill it, and for which the user does not or cannot specify to a computer to allow the computer to fulfill the request automatically. For example, one event may be a request for wire transfers of funds from an account, while another event may be a request for information about transferring securities from one broker to another broker. In one embodiment, an event is anything for which a customer may be routed to a human source of information. The source may be a human with specialized knowledge (and to whom callers are routed only after a human without that knowledge has identified the need to transfer the caller to the human with specialized knowledge) or may be a subset of an automated customer service representative for which knowledge of the information generally sought can be helpful in discerning what the customer needs. There may be any number of events and events may be specifically or generally defined, as long as different events' definitions don't overlap, in one embodiment.

Registration information is optionally received 212. In one embodiment, registration information may include any or all of a phone number or a username and optionally a password that the user will use to identify himself or herself when using a web site. In one embodiment, the registration information includes an IP address or device identifier.

In one embodiment, the user uses the registration information to log in via a computer system or app on a device. In one embodiment, a cookie or other similar information is added to the user's computer system or device, and the information from the user's computer system or device may be associated on a server with the registration information that was used to log in 214 to later identify the user. In another embodiment, no registration information is used, and the user can be identified only by the cookie or other similar information such as an app identifier.

Events and actions of users may be received and logged, for example by storing a unique identifier of the event or action at a server with a date and time, as well as information that can be used to tie the same user to different events and actions 216.

In one embodiment, an action includes a visit to a URL, or to a user interface screen on an app. In one embodiment, an action includes a visit to a series of two or more URLs or user interface screens, either in sequence or in any order, with or without visits to intervening other URLs or user interface screens before the sequence is complete. An action may include hovering over a link or hovering over a link for a specific period of time. Javascript scripts are placed on a web page or as part of a link to report back to a server the user identifier (e.g. from a cookie or the IP address) and a unique action identifier that logs these types of actions. Software that reports events to a server may be added to the software an agent uses to respond to events to allow the user identifier (e.g. the phone number or IP address) to be reported with a unique identifier of the event to which the agent responded once the agent determines the specific event the user wished to experience.

The information that can be used to tie the user is an IP address, device identifier, cookie identifier that is associated with a user identifier at a server, or other similar information, when actions are received. If the event is a phone call for a specific type of information, the phone number of the caller is stored with the event. In one embodiment, the user's phone number is received via conventional automatic number identification services. In one embodiment, the information used to tie the user is requested from the user if the phone number is not associated with any user.

The information used to tie the user may be different information at different times. For example, if the user is logged in, the user's IP address may be used, or cookie or other similar information may be used as the information to tie the user. If the user calls, automatic number identification information may be used. The same user can be tied to different actions or events, for example, based on the fact that the telephone number was registered or used and entered by a customer service agent during an event and the telephone number was associated with the same account as that associated with the cookie or IP address used to request an action at a different time. The user may not be logged in and the cookie may be unavailable, and so the IP address may be one the user has used before, the last N of which are stored at the server.

The action and event log may be filtered 218 to remove entries, for example, those older than a certain time period before the next nearest event.

In one embodiment, each action logged may be required to have a minimum amount of time spent before a different action is performed. For example, if an action is a visit to a URL, but the user then quickly selects a different URL, the visit will be filtered out of the results below and not used for any of the calculations below, and in another embodiment, it will be used. Such duration of an action or event may be inferred from the time that the next action or event is requested by the user.

In one embodiment, the actions of a user are only used for the calculations below if they have occurred within a certain amount of time of the same user performing an event, and are filtered otherwise, and in another embodiment they are not filtered for this reason.

Once a sufficient number of actions and events have been recorded for a sufficient number of users, the following calculations are performed using the data logged as described above. In one embodiment, a sufficient number is 100 occurrences of the same event across all events, for each of at least one event or for all events.

Calculations.

The calculations of steps 220-234 use the data from multiple users or all users who have performed a sufficient number of actions and/or events, such as at least 5 actions before each of two events, though other embodiments may use other thresholds or no thresholds.

The probability of each event is calculated 220. To calculate the probability of an event, the number of users who experienced that event is divided by the total number of users. In one embodiment, a user using two different identifiers, an IP address or cookie on a web site activity, and a phone number in a customer service event, is counted as one user if there is a way to link the two identifiers to the same user as described above, for all calculations including the probability of an event.

The probability of an action is computed 222. The probability of an action is the number of users who performed that action divided by the total number of users.

The probability of an action being performed by a user who also experienced an event, relative to the number of users who experienced that event is computed for each combination of action and event 224. This is computed by dividing the number of users who experienced the event and who also performed the action by the total number of users who experienced that event.

An interim measure is calculated 226 for each combination of action and event by multiplying the result of the calculation of step 224 for the combination of action and event by the result of the calculation of step 220 for that event.

The PMI of an action and event is calculated 230 for each combination of action and event. In one embodiment, the PMI of an action and event is the log of the result of the calculation of step 224 for that combination of action and event divided by the probability of that action being performed by a user as described in step 222.

The normalized PMI for each combination of action and event is calculated 232. The normalized PMI for an action and event is the log of the result of the calculation of step 230 for that action and event divided by the negative of the log (i.e. −log) of the result of step 226 for that action and event. It is noted that the calculations described in steps 220-232 may be calculated in any order or manner. In one embodiment, the statistics of step 232 measure the ability of an action to predict an event.

Removal of Actions from Consideration for Predicting an Event.

In one embodiment, actions are tested to determine whether they should be used for predicting whether the user will desire a given event. Other actions are not used for calculations to predict an event. In one embodiment, a first combination of action and event is selected and the result for step 224 is compared to a first threshold for a given action, and the result for step 232 for the selected action and event is compared to a second threshold, which may be the same or different from the first threshold 236. If the result is below either threshold 238, the action is not used to predict whether the user wishes to participate in that event 240 and the method continues at step 242 and otherwise 238, the method continues at step 242. In one embodiment, if the first comparison of step 236 fails, the second comparison of step 236 need not be undertaken.

At step 242, if there are more action/event combinations, the next action/event combination is selected 244 and the method continues at step 236 using the newly selected action/event combination, and otherwise 242, the actions used for predictions as determined above, and events, for each user identifier or set of user identifiers that identifies a unique user and the date and times are built into a vector 246 and the method continues at step 248 of FIG. 2B. In one embodiment, any actions that are not used to predict any event are not built into a vector for any user. In another embodiment, multiple vectors are built for each user, one for each event the user requested, along with actions the user took within a threshold amount of time before the user requested the event, provided the actions were identified using the thresholds as actions used to predict that event, and the vectors are processed one event at a time, for all users who requested the event in step 248 as described below. In the embodiment in which only a single vector is built for each user, the machine learning/big data model takes into account for each event, only the recent actions used to predict that event and ignores the other actions. What events are 'recent' may be identified using conventional regression analysis techniques.

At step 248 of FIG. 2B, the vectors for each user who requested at least one event are processed, for example, by using conventional regression analysis, to identify the contribution to a probability that a user would request an event based on the action or a combination of actions, the combination being ordered or not ordered, the time difference between the user requested the event and the action or combination of actions (such time for difference for a combination of actions being measured from the last action, the first action, or an average time), the order of the actions or the combination relative to other actions or combinations the user may take after the action or combination of actions and before the event, and the length of time the user performed the action or combination of actions. The length of time for a combination of actions may be the sum of the lengths of time of the actions in the combination, or the end time of the last action in the combination less the start time of the first action in the combination. In one embodiment, other events already requested by the user before an event may also be assigned a contribution to the probability that the user will request the latter event, and the time difference between the request for the event and the request for the earlier event. Contributions to probabilities may be negative or positive in one embodiment.

In one embodiment, each vector for a given user or user and event includes a label that uniquely identifies the action (e.g. the user requested a specific web page or hovered over a link) or event (the user requested wire transfer instructions from an agent), the date and time the action or event was requested, and the length of time the user performed the action or event if available, for each such action being used to predict events or event, optionally ordered in date and time order. Lengths and time differences may be converted into identifiers of ranges, for example number of minutes or hours, or they may be converted into enumerated ranges of different lengths, with shorter ranges on the low end and longer ranges on the high end, such as number of minutes if less than an hour, then numbers that indicate number of hours, and then numbers that indicate number of days.

Use of Logged Information to Route Requests for Information.

At any time after the steps of FIG. 2A and 248 have been carried out, and while actions and/or events continue to be logged, an ambiguous request for an event is received 250. In one embodiment, an ambiguous request for an event is one in which a type of event is specified, but the specific event being requested is unknown. For example, the type of event may be a text request for assistance, with the subject matter of the request unspecified. In one embodiment, all of the events are defined to be of the same type of event, while in other embodiments, different events may be categorized into different types of events.

The user identifier of the user from whom the ambiguous request is received is identified 252. The identification may be made via any of the methods described above and herein. For example, if the request is made via a phone call, the calling number may be used to locate the user identifier in a table of user identifiers and physical identifiers such as phone numbers, IP addresses used when the user logs in, cookie identifiers and so on.

The log of user actions identified as being used for predictions as described above, and optionally events requested, of the user whose user identifier is identified, is retrieved and the recent actions performed by the user and used for predictions, and optionally recent events requested by the user, are built into a vector with the date and time and lengths in the same manner as described above 254. In one embodiment, the actions and events each have a unique identifier and that identifier is retrieved from the log with the date and time. The retrieval of actions may be made for all identifiers associated with the user whose identifier was identified. For example, if the user calls in for service, the user's calling number is used to locate the user identifier of the user, and then the logged actions for all of the identifiers associated with that user identifier are retrieved, the actions including other phone calls, and/or one or more web URLs visited, identified via a cookie identifier or IP address associated with the same user identifier as the calling number. In one embodiment, only the most recent actions for the user are retrieved from the log, such as the N most recent actions or actions not older than a threshold amount of time.

In one embodiment, only actions that are to be used to predict all possible events as described above are retrieved, or the others may be filtered after retrieval, or never logged. The possible events may be all events or may be all events that are likely based on the context of the request. For example, if there are two buttons on a web page, and one button is labeled for events in subset A and another button is labeled for events subset B, only the actions that are to be used to predict any of the subset of events corresponding to the button the user pushed will be retrieved, or all may be retrieved but the others are filtered. In one embodiment, the recency of the actions or events required to build the action or event into the vector may be determined by the maximum time difference that has a probability contribution greater than a threshold, such as 0.01, for that action or combination of actions, or event or for all of them to predict any possible event.

The contributions to the probabilities identified above are applied to each of the actions and events in the vector using conventional machine learning/big data techniques to identify the event most likely being requested 256 from those stored as described above for the request. The probability that the user is requesting that event is identified with the event.

If the selected event has a probability above a global threshold for all events or above a threshold for that event 258, a request distributor is directed to route the requestor to a specific handler or specific group of handlers that are trained to handle the event 260, and otherwise 258 the request distributor is directed 262 to route the requestor to a generic handler who may not have training to handle the events to which requestors are routed. The distributor complies with either request. The generic handlers can handle more frequently occurring events or events that require a lower amount of training per event. The thresholds described above are received as part of step 210. In one embodiment, a confidence level may be computed for the vector using conventional regression analysis techniques, and a threshold confidence level or confidence level is also required in addition to the threshold probability.

In one embodiment, the distributor includes a hardware computer-controlled distributor such as a telephone call router, or e-mail forwarder or text message router that can route calls or e-mails or text messages upon receiving an instruction to do so. In one embodiment, the distributor is the device that receives the request, and the distributor forwards identifier information from the request, such as calling number, sender's e-mail address or IP address from the sender of a text message to be processed as described above, waits for instructions on how to route the requestor, and then routes the requestor according to the direction.

At any time before they are used, distributor settings are received 266. Distributor settings include a location at which a handler can be reached, such as an IP address or phone number and identifiers of an event or events that the handler has specifically trained or learned expertise that the handler can use to handle the event.

It is noted that machine learning/big data techniques are not required as part of the invention, as conventional non-big-data regression analysis techniques may be used in place of the big data techniques described herein and above.

Step 250 follows steps 260 and 262, to receive another request. Any number of users, actions, events and requests may be processed by the present invention. Occasionally, the steps of FIG. 2A and step 248 may be repeated to update the information described.

System.

Figure 3:
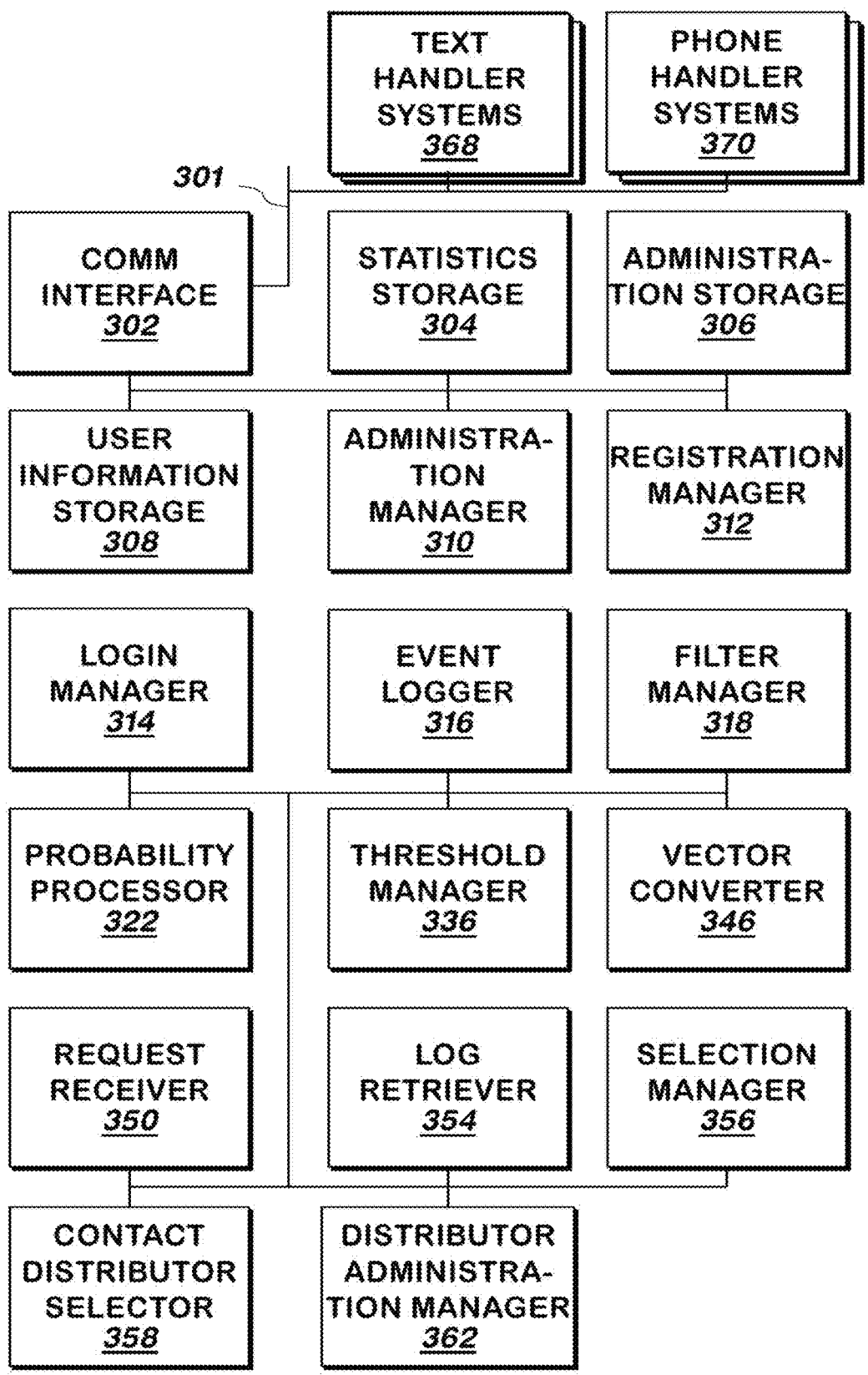
FIG. 3 is a block schematic diagram of a system for according to one embodiment of the present invention.

Referring now to FIG. 3, a system for routing requests is shown according to one embodiment of the present invention.

Communication interface 302 includes a conventional TCP/IP communication interface, and may include a conventional IP telephone communication interface such as the CISCO SPA8000 telephony gateway. Communication interface 302 includes input/output 301 coupled to a conventional communication network, including an Ethernet network, the internet or both, as well as a conventional telephone network. Unless otherwise specified, all communication into or out of the system of FIG. 3 is made via input/output 301 of communication interface 302.

Administration manager 310 receives identifiers of events and event thresholds as described above and stores them in administration storage 306. Registration manager 312 receives conventional registration information from multiple users, including phone numbers as described above, and stores such information in user information storage 308 associated with identifiers of the users. Administration storage 306, and user information storage 308, may each include conventional memory or disk storage, and may include a conventional database. The operation of registration manager 312 may be a continuously or occasionally running process, as indicated by the dashed line in the figure.

Login manager 314 continuously or occasionally receives user logins and deposits a cookie or receives an app log in and associates the app or device identifier with a user for each of several users as described above. The user may then perform events and or actions, and event logger 316 receives requests for events or actions and stores them into an action log, or an event log, or both in user information storage 308 associated with the user identifier, the date and time of the request, and may identify the length of time from any prior request for an event or action as described above. Event logger 316 performs this function for multiple events for multiple users as indicated by the dashed line in the Figure. Event logger 316 may also allow customer service representatives to log actions or events for the users as they are performed by the representative.

Occasionally, or continually, filter manager 318 optionally filters the action or event log, or both stored in user information storage 308 as described above. Occasionally or continually, probability processor 322 performs steps 220 through 232 using the action and event logs as described above. The results are stored for each action and event by probability processor 322 in statistics storage 304, which includes conventional memory or disk storage and may include a conventional database.

When probability processor has completed its operation for the current iteration, probability processor 322 signals threshold manager 336. When signaled, threshold manager 336 selects the first action and event combination, and tests to ensure that the thresholds described in step 236 above have been met. If the thresholds have not been met, threshold manager 336 marks in statistics storage 304 the action as being inapplicable for consideration with the event as described below. Threshold manager 336 repeats the selection and test and potential marking for all combinations of actions and events in statistics storage 304. When all such combinations have been processed by threshold manager 336, threshold manager 336 signals vector converter 346. When signaled, vector converter 346 converts the actions and events and their times and/or time differences to the vectors for each identifier of the user as described above and signals probability processor 348, for those combinations not marked as inapplicable for consideration.

The vectors are processed using big data techniques as described above to identify the probability of the user wanting an event as a function of having performed an action, combinations, time, delta, length of time, order, and/or events requested by probability processor 348 when signaled as described above. Probability processor 348 stores the probabilities into user information storage 308 associated with the identifier of each user. The action and event combinations marked as inapplicable for consideration may be skipped by probability processor 348.

Request receiver 350 receives requests for events, which are ambiguous, and identifies the user identifier of the request or as described above. Request receiver 350 provides the user identifier to log retriever 354, which retrieves the log of recent user actions used for predictions from user information storage 308, and optionally events which it converts to a vector as described above. Log retriever 354 provides the vector and the user identifier to selection manager 356, which selects the most likely event, and computes the probability of that most likely event. Selection manager 356 provides the probability and the user identifier along with an event identifier of the most likely event that it selects to contact distributor selector 358. Contact distributor selector 358 determines whether the probability of the event exceeds a threshold as described above, and if so it directs contact distributor 362 route the request or to the handler for the selected event as described above, and otherwise directs contact distributor 362 route the request or to a generic handler who is not specially trained to handle the selected event. Distributor administration manager 362 receives and stores in administration storage 306 for each handler system 368, 370 a location (such as a phone number or IP address to which text messages may be sent) and event identifier or identifiers the handler (e.g. a person or a bot) at that handler system 368, 370 to which the corresponding handler can respond, and contact distributor uses such information to route the request corresponding to the event. Handler systems 368 may be convention computer systems or IP or conventional phone systems that may be used by the handler to respond to events.

Request receiver 350 may receive and process any number of requests for events from any number of users in this fashion.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database.

Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

CERTAIN EMBODIMENTS

Described is a method of routing a first plurality of events, including requests for any of two or more types of information not known at the time the request is received, to people who will initially handle each event, including:
  recording two or more actions two or more users took, and a second plurality of events of the two or more users, and the dates and times of the actions and events;
  converting at least some of each combination of A) the recorded plurality of actions and B) the second plurality of events each user performed into a vector for that user, for each of the two or more users;
  determining a probability that any user in the two or more users will perform each of the second plurality of events within each of two or more ranges of times after the user has taken each of at least some of the two or more actions responsive to the vectors for each of the users;
  receiving an event from a user including one of the two or more users or a different user for whom at least one action has been recorded;
  converting the at least one action recorded for the user into a vector;
  using the vector and the probabilities determined to predict one of the two or more types of information corresponding to the event received from the user; and
  directing a hardware distributor to route the event to at least one of the people who will initially handle the event responsive to said prediction.

The method:
may additionally include:
  using the recorded actions and events to determine a measure of ability of an each action to predict each event; and
  removing actions from being considered to predict an event responsive to the measure;
and may contain additional features whereby the converting at least some of each combination of A and B into the vector for the user includes converting unremoved actions and events to a vector for each of the two or more users.

The method:
may additionally include receiving a mapping of the people who provide at least one type of information to said at least one type of information;
and may contain additional features whereby the directing the hardware distributor step is additionally responsive to the mapping.

The method may contain additional features whereby the determining the probability step includes obtaining at least one logarithm.

The method may contain additional features whereby the at least one logarithm includes at least one logarithm for each of two or more combinations of actions and events.

The method may contain additional features whereby the at least one logarithm for each of the two or more combinations of actions and events includes at least one logarithm for every combination of action and event.

Described is a computer program product including a computer useable medium having computer readable program code embodied therein for routing a first plurality of events, including requests for any of two or more types of information not known at the time the request is received, to people who will initially handle each event, the computer program product including computer readable program code devices configured to cause a computer system to:
  record two or more actions two or more users took, and a second plurality of events of the two or more users, and the dates and times of the actions and events;
  convert at least some of each combination of A) the recorded plurality of actions and B) the second plurality of events each user performed into a vector for that user, for each of the two or more users;
  determine a probability that any user in the two or more users will perform each of the second plurality of events within each of two or more ranges of times after the user has taken each of at least some of the two or more actions responsive to the vectors for each of the users;
  receive an event from a user including one of the two or more users or a different user for whom at least one action has been recorded;
  convert the at least one action recorded for the user into a vector;
  use the vector and the probabilities determined to predict one of the two or more types of information corresponding to the event received from the user; and
  direct a hardware distributor to route the event to at least one of the people who will initially handle the event responsive to said prediction.

The computer program product:
may additionally include computer readable program code devices configured to cause the computer system to:
  use the recorded actions and events to determine a measure of ability of an each action to predict each event; and
  remove actions from being considered to predict an event responsive to the measure;
and may contain additional features whereby the computer readable program code devices configured to cause the computer system to convert at least some of each combination of A and B into the vector for the user comprise computer readable program code devices configured to cause the computer system to convert unremoved actions and events to a vector for each of the two or more users.

The computer program product:
may additionally include computer readable program code devices configured to cause the computer system to receive a mapping of the people who provide at least one type of information to said at least one type of information;
and may contain additional features whereby the computer readable program code devices configured to cause the computer system to direct the hardware distributor are additionally responsive to the mapping.

The computer program product may contain additional features whereby the computer readable program code devices configured to cause the computer system to determine the 785 probability comprise computer readable program code devices configured to cause the computer system to obtain at least one logarithm.

The computer program product may contain additional features whereby the at least one logarithm includes at 790 least one logarithm for each of two or more combinations of actions and events.

The computer program product may contain additional features whereby the at least one logarithm for each of the two or more combinations of actions and events includes at 795 least one logarithm for every combination of action and event.

What is claimed is:
1. A system comprising:
  at least one processor; and
  a memory coupled to the at least one processor, wherein the memory includes at least one database storing
    a plurality of actions taken by a plurality of users, a plurality of events taken by the plurality of users, and dates and times of each of the plurality of actions and the plurality of events,
at least one vector including a user identifier, at least one action of the plurality of actions, an event of the plurality of events taken after the at least one action, and a date and time of each of the at least one action and the event, the user identifier identifying a user of the plurality of users who completed the at least one action and the event,
probabilities, for each of the plurality of events included in one of the at least one vectors, that a first event will occur within a time period of at least one first action, and
instructions that when executed by the at least one processor cause the system, in response to receiving an unknown event from a target user who has performed at least one action of the plurality of actions, to perform,
converting the at least one action of the target user into a target vector,
predicting, based on the target vector and the probabilities, the unknown event received from the target user, and
directing a hardware distributor, based on the predicting the unknown event, to route the unknown event received from the target user to an agent responsible for handling the unknown event.

2. The system of claim 1, wherein the plurality of actions are filtered to exclude any actions that are older than a threshold time period prior to a closest event of the plurality of events.

3. The system of claim 1, wherein the database further stores a mapping of the plurality of users who provide registration information to the provided registration information.

4. The system of claim 3, wherein the directing the hardware distributor is further based on the mapping.

5. The system of claim 1, wherein the probabilities, for each of the plurality of events included in one of the at least one vector, that the first event will occur within the time period of the at least one first action are calculated by dividing a number of the plurality of users who experienced the first event and who performed the at least one first action by a total number of the plurality of users.

6. The system of claim 5, wherein
the database further stores an interim measure for the first event and the at least one first action, and
the interim measure is calculated by multiplying the probability that the first event will occur within the time period of the at least one first action by a probability of the first event occurring.

7. The system of claim 6, wherein the probability of the first event occurring is calculated by dividing the number of the plurality of users who experienced the first event by the total number of the plurality of users.

8. The system of claim 6, wherein
the database further stores pointwise mutual information (PMI) of the first event and the at least one first action, and
the PMI of the first event and the at least one first action is calculated by dividing a logarithm of the interim measure by a probability of the at least one first action occurring.

9. The system of claim 8, wherein the probability of the at least one first action occurring is calculated by dividing the number of the plurality of users who performed the at least one action by the total number of the plurality of users.

10. The system of claim 8, wherein
the database further stores a normalized PMI of the first event and the at least one first action that measures an ability of the at least one first action to predict the first event, and
the normalized PMI is calculated by dividing a logarithm of the PMI by a negative logarithm of the interim measure.

11. The system of claim 10, wherein the at least one first action is filtered from the plurality of actions if at least one of the probability of each of the plurality of events occurring within the time period of the at least one first action is below a first threshold or the normalized PMI of each of the plurality of events and the at least one first action is below a second threshold.

12. A method comprising:
storing a plurality of actions taken by a plurality of users, a plurality of events taken by the plurality of users, and dates and times of each of the plurality of actions and the plurality of events;
storing at least one vector including a user identifier, at least one action of the plurality of actions, an event of the plurality of events taken after the at least one action, and a date and time of each of the at least one action and the event, the user identifier identifying a user of the plurality of users who completed the at least one action and the event;
calculating probabilities, for each of the plurality of events included in one of the at least one vectors, that a first event will occur within a time period of at least one first action; and
in response to receiving an unknown event from a target user who has performed at least one action of the plurality of actions,
converting the at least one action of the target user into a target vector,
predicting, based on the target vector and the probabilities, the unknown event received from the target user, and
directing a hardware distributor, based on the predicting the unknown event, to route the unknown event received from the target user to an agent responsible for handling the unknown event.

13. The method of claim 12, further comprising:
filtering the plurality of actions to exclude any actions that are older than a threshold time period prior to a closest event of the plurality of events.

14. The method of claim 12, further comprising:
storing a mapping of the plurality of users who provide registration information to the provided registration information, wherein the directing the hardware distributor is further based on the mapping.

15. The method of claim 12, wherein the calculating the probabilities, for each of the plurality of events included in one of the at least one vector, that the first event will occur within the time period of the at least one first action comprises dividing a number of the plurality of users who experienced the first event and who performed the at least one first action by a total number of the plurality of users.

16. The method of claim 15, further comprising:
calculating an interim measure by multiplying the probability that the first event will occur within the time period of the at least one first action by a probability of the first event occurring.

17. The method of claim 16, wherein the probability of the first event occurring is calculated by dividing the number of the plurality of users who experienced the first event by the total number of the plurality of users.

18. The method of claim 16, further comprising:
calculating pointwise mutual information (PMI) of the first event and the at least one first action by dividing a logarithm of the interim measure by a probability of the at least one first action occurring, wherein the probability of the at least one first action occurring is calculated by dividing the number of the plurality of users who performed the at least one action by the total number of the plurality of users.

19. The method of claim 18, further comprising:
calculating a normalized PMI of the first event and the at least one first action that measures an ability of the at least one first action to predict the first event by dividing a logarithm of the PMI by a negative logarithm of the interim measure.

20. The method of claim 19, further comprising:
filtering the at least one first action from the plurality of actions if at least one of the probability of each of the plurality of events occurring within the time period of the at least one first action is below a first threshold or the normalized PMI of each of the plurality of events and the at least one first action is below a second threshold.

* * * * *